United States Patent [19]

Mojden et al.

[11] Patent Number: 4,676,708
[45] Date of Patent: Jun. 30, 1987

[54] STACK DEVELOPING AND VERTICAL ELEVATING ASSEMBLY AND METHOD THEREFOR

[75] Inventors: Wallace W. Mojden; Andrew E. Mojden, both of Hinsdale, Ill.

[73] Assignee: Fleetwood Systems, Inc., Countryside, Ill.

[21] Appl. No.: 821,991

[22] Filed: Jan. 24, 1986

[51] Int. Cl.$^4$ .............................................. B65G 57/16
[52] U.S. Cl. .................................... 414/33; 198/468.7; 198/739; 414/32; 414/92; 414/114; 414/786
[58] Field of Search ............... 198/468.7, 739; 414/92, 414/93, 32, 330, 108, 114, 786, 33, 46, 109

[56] References Cited

U.S. PATENT DOCUMENTS

| | | | |
|---|---|---|---|
| 602,647 | 4/1898 | Steegmüller | 198/468.7 X |
| 3,722,741 | 3/1973 | Mojden | 221/11 |
| 4,000,709 | 1/1977 | Mojden | 113/114 |
| 4,537,550 | 8/1985 | Mojden et al. | 414/46 |

Primary Examiner—L. J. Paperner
Assistant Examiner—Janice Krizek
Attorney, Agent, or Firm—Trexler, Bushnell Giangiorgi & Blackstone Ltd.

[57] ABSTRACT

Method and apparatus for supplying can ends or the like to a downstream processing unit, such as a rotary carousel feeder unit or the like comprises a generally horizontal trough section for accumulating in stacked array can ends delivered from an upstream source. A transfer pocket is disposed generally vertically above and to one end of the trough section for receiving a quantity of can ends in stacked array from the trough section. An intermediate transition chute of generally arcuate configuration extends upwardly from the trough section to the transfer pocket to interconnect the two. A transport arrangement is provided for separating out and driving a quantity of the stacked accumulated ends in the trough section along the trough section and through the arcuate chute and further into the transfer pocket. A retaining arrangement is provided for maintaining the quantity of stacked ends in the vertically disposed transfer pocket upon retraction of the transport arrangement. The transport arrangement comprises a horizontal transport portion for transporting the separated can ends through the trough section and into the arcuate chute and also includes a rotatable swing-arm for driving the quantity of ends fully through the arcuate section of said chute and into the vertical transfer pocket.

19 Claims, 6 Drawing Figures

STACK DEVELOPING AND VERTICAL ELEVATING ASSEMBLY AND METHOD THEREFOR

BACKGROUND OF THE INVENTION

This invention relates generally to apparatus for handling a continuous supply of can ends, or like articles, and more particularly is directed to a device for developing or otherwise segregating and thereafter vertically elevating discrete stacks or groups of these can ends or other articles.

Modern canning operations often include not only apparatus for filling and sealing the cans but also machinery for fabricating and/or assembling the can components, that is, the can ends and can bodies. In any event, a top closure or can end is generally assembled with the can subsequent to filling thereof. In such operations, it is therefore necessary to transport or otherwise handle the can ends in large quantities between fabricating or other intake or receiving machinery and further downstream processing apparatus.

Moreover, modern can processing and manufacturing equipment operates at high rates of speed to attain commercially attractive production costs. Hence, the can end parts must be supplied to the processing or assembly equipment at correspondingly high rates of speed to maintain the overall speed and efficiency of the operation. To maintain and provide this continuous, high speed supply of can ends without constant supervision and attention by one or more employees, apparatus such as that described and claimed in U.S. Pat. Nos. 3,722,741 and 4,000,709, both assigned to the Assignee of record herein, have been utilized, the disclosures of which patents are incorporated herein by reference. Generally speaking, can end infeed units described in these patents particularly in columns 2 and 3 referring to FIGS. 1-3 of the U.S. Pat. No. 3,722,741 and columns 1 and 3 referring to FIGS. 1 and 2 of the U.S. Pat. No. 4,000,709, provide a plurality of can end carrier or pocket members, each carrier or pocket member being capable of receiving and storing a separate generally vertically arranged stack or "stick" of can ends. These infeed unit carrier members, each filled with a stack of can ends are then individually indexed to a delivery station. At the delivery station, an ejector mechanism delivers the can end stack from the infeed pocket member to the intake structure of the downstream processing equipment.

The filling of the carrier or pocket members of the infeed units of the above-mentioned prior art designs with stacks of can ends is basically a manual operation. Upon manufacture of the can ends, they are packaged in kraft paper bags and palletized for delivery to the infeed unit. An operator then inserts a bagged stack of can ends in the carrier member and strips off the paper bag.

To alleviate the need for manual filling of the pockets, an automatic stack developing and loading system was developed, and such a system is described in U.S. Pat. No. 4,537,550 to Mojden et al. which patent is owned by the Assignee of record herein, and its disclosure is also incorporated herein by reference. Briefly, the apparatus described in this U.S. patent permits a continuous stream of can ends to be supplied directly from the fabricating machinery to the infeed storage and supply units as disclosed in the above-mentioned patents. In this regard, the stream of incoming ends from the fabricating machinery is separated or split into discrete stacks and transported to a transfer station. This transfer station is positioned for operative alignment with the carrier or pocket members of the infeed unit, such that when an empty carrier member is aligned with the transfer station a stack of ends will be laterally shifted and deposited into the carrier member automatically. The infeed units of the above first mentioned patents are thereby permitted to function as a magazine or accumulator to store a large supply of ends in the multiple carrier units thereof, permitting a relatively large supply of can ends to be delivered at a rate to match the demand therefor at the downstream processing machinery.

The automatic stack developing and loading system of the above-mentioned U.S. Pat. No. 4,537,550 utilizes a horizontal trough for accumulating a horizontally disposed stack of can ends delivered from an upstream source. A transport clamp member is then selectively engaged at a predetermined point in the stack to separate and engage a quantity of can ends. A generally arcuate transfer chute is disposed intermediate the horizontal trough and a vertical transfer pocket disposed generally vertically above the trough. Accordingly, the movement of the clamp longitudinally along the trough acts to drive the separated group of can ends into the arcuate transition chute. The movement of the separated stack of ends into the transition chute will force any ends previously deposited in said chutes upwardly toward and into the vertical transfer pocket. Further reference to the patent is suggested for an appreciation of further details of the system disclosed therein.

While the system of the foregoing U.S. patent has met with commercial success, there is room for yet further improvement. More specifically, with the system of the '550 patent the ends were not positively driven through the transition chute and into the vertical transfer pocket. To the contrary, with this design the clamp arrangement which is used to initially separate a stack of ends, is relied upon to attain the necessary upstream movement of the ends. This feature proved troublesome in certain environments and with larger size ends. As such, the present invention was developed as an improvement wherein a positive drive arrangement is provided for moving the ends through the transition chute, which drive arrangement does not rely upon the movable clamp arrangement initially employed to separate a stack of ends.

OBJECTS OF THE INVENTION

Accordingly, it is a general object of the invention to provide a novel and improved stack developing and vertical elevating assembly or system for supplying discrete stacks of can ends or the like to downstream processing equipment.

A more particular object is to provide a system in accordance with the foregoing object wherein the can ends are initially separated into discrete stacks and thereafter continuously advanced and supported in these discrete stacks, with the support being continuous until each stack is securely held within a vertical transfer pocket.

A related object is to provide a system in accordance with the foregoing objects including an actuator and drive arrangement for separating and thereafter advancing and supporting the discrete stacks of can ends at various stages in their transfer from a continuous horizontal array to a succession of discrete vertical stacks within a vertical transfer pocket, and a control arrangement for actuating the respective advancing and supporting operations in a predetermined sequence to assure smooth, continuous operation thereof.

BRIEF DESCRIPTION OF THE DRAWINGS

The features of the present invention which are believed to be novel are set forth with particularity in the appended claims. The organization and manner of operation of the invention together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
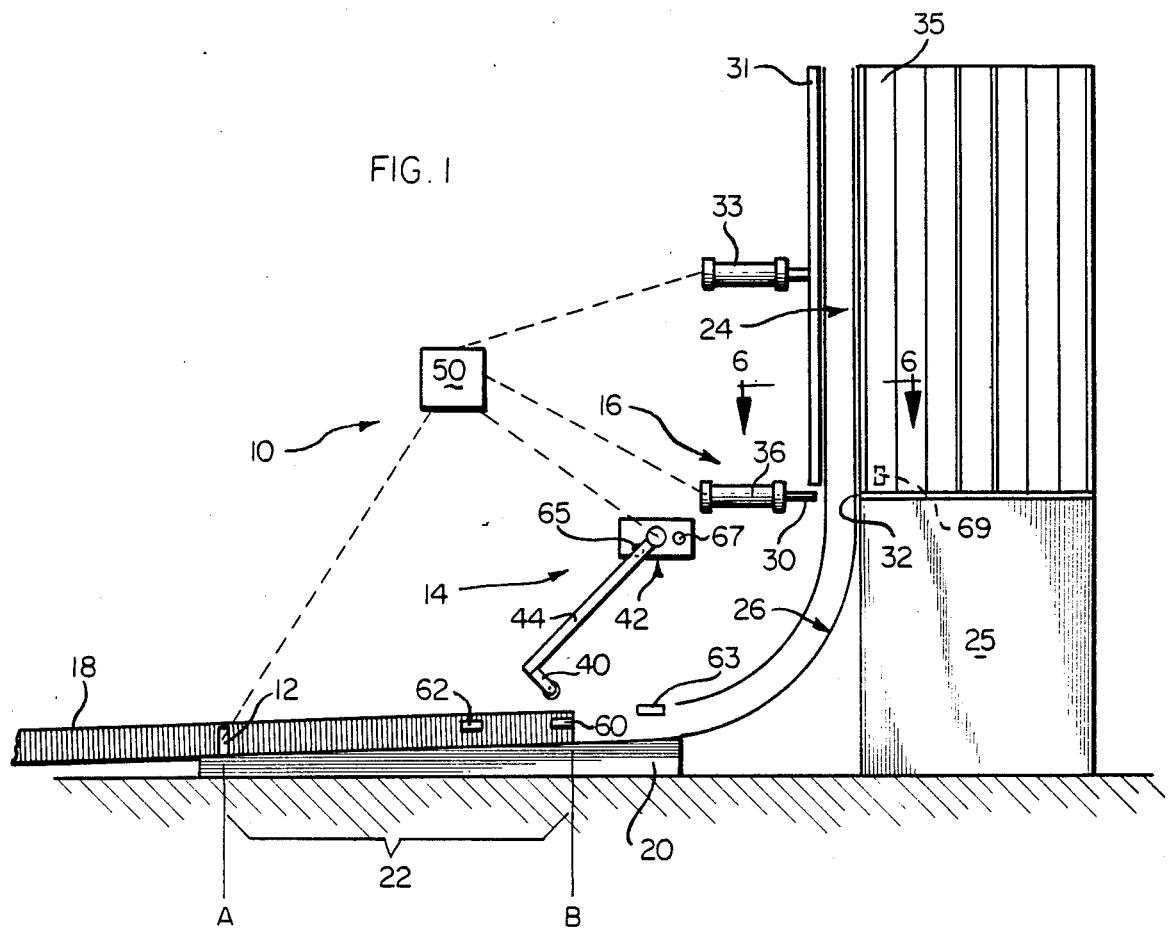
FIG. 1 is a schematic side elevational view of the stack developing and vertical elevating assembly of the invention, with the positions of the elements thereof as they appear during an initial or early stage of stack development of articles.
Figure 2:
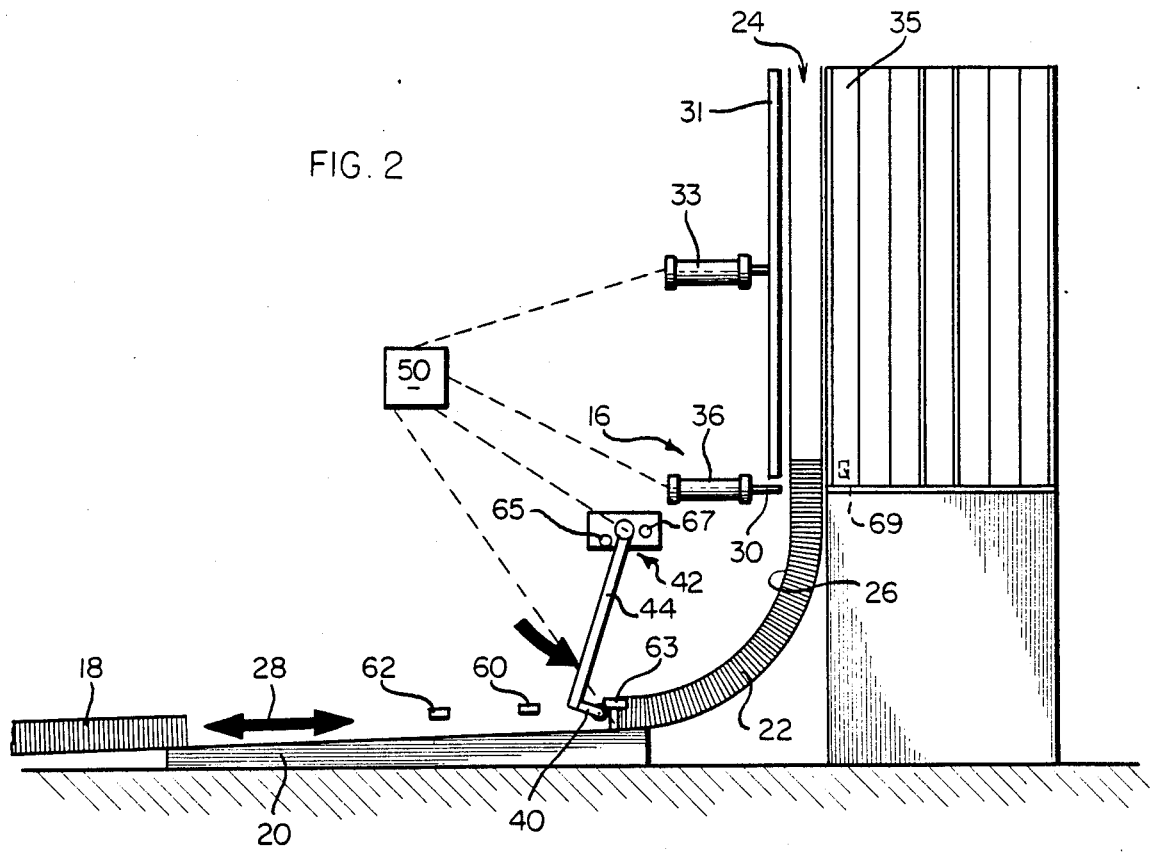
FIG. 2 is a schematic side elevational view similar to FIG. 1 showing the assembly as it appears during a later stage in the development of the same stack of articles.
Figure 3:
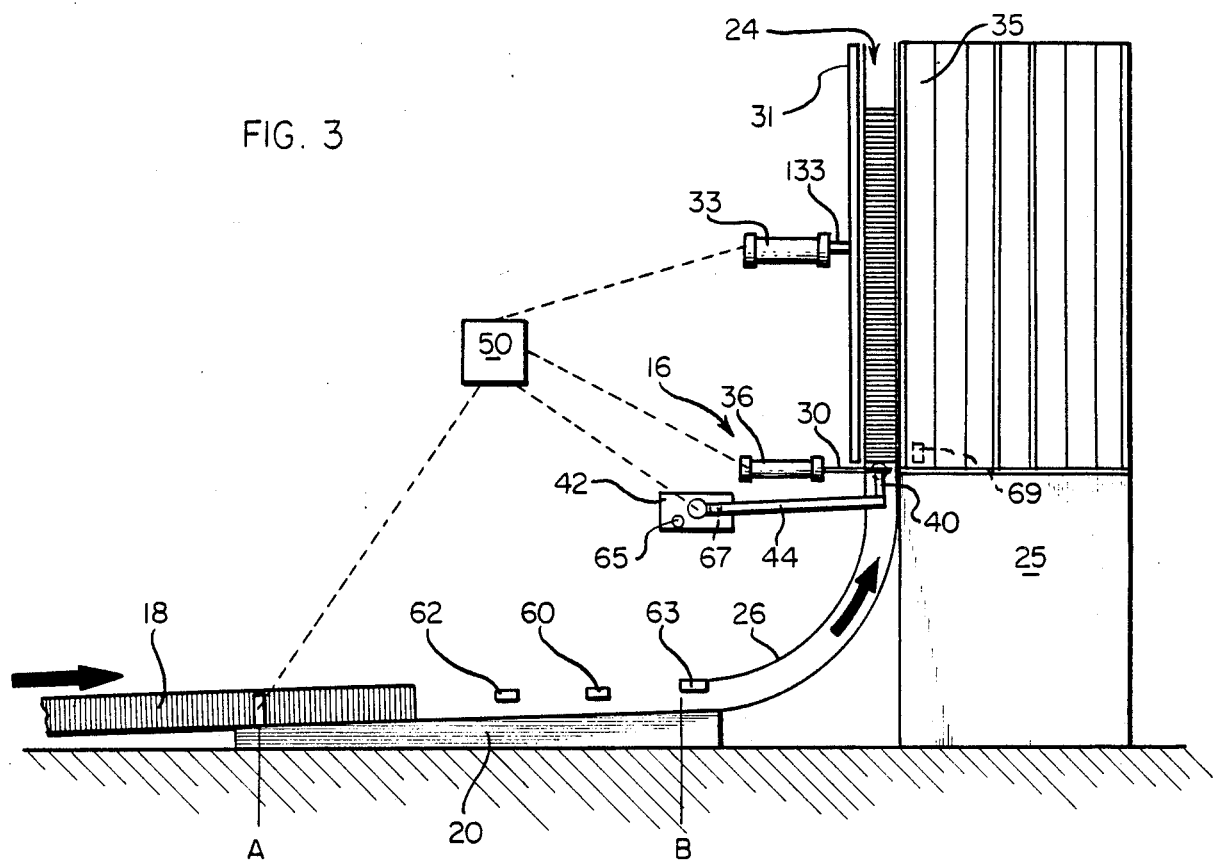
FIG. 3 is a further schematic side elevational view similar to FIGS. 1 and 2 and showing the assembly of the invention as it appears during a still later stage in the development and vertical elevating of the same stack of articles.

Referring now to the drawings an initially FIGS. 1 through 3, the apparatus or system for splitting, separating or "developing" a continuous stream of articles into discrete stacks and thereafter vertically elevating these stacks is shown in somewhat schematic form. Generally, the system includes a stack developing or separating and transport means 10 which includes a horizontal transport means or arrangement 12, and a vertical elevating means or arrangement 14. Retaining means 16 are provided for maintaining the stacked ends in a vertically disposed stacked condition following vertical elevation thereof, and preparatory to transfer to an infeed unit 25.

As shown sequentially in FIGS. 1 through 3, the apparatus receives can ends 18 in a generally continuous array or nested condition from an upstream source (not shown) such as a can end fabricating machine. The ends 18 move along a trough or other generally horizontal guideway 20 past the horizontal transport means 12. As will be more fully described later herein, when a sufficient quantity of can ends has been delivered to the trough 20, the horizontal transport means 12 is activated to separate the ends into an appropriately sized stack or "stick" 22 and transports this stack 22 to the right as viewed for further advancement by the vertical elevating means 14. This discrete stack 22 is then elevated to a vertical transfer pocket or other similar mechanism 24, which in turn feeds or transfers the vertical stacks to a carousel-type infeed unit 25 of the type disclosed in the first of the above-mentioned patents or to other downstream processing apparatus.

Accordingly, the system of the present invention comprises the generally horizontal trough section 20 for accumulating in stacked array can ends delivered from an upstream source, the transfer pocket 24 disposed vertically above and to one end of the trough and also an intermediate transition chute 26 of generally arcuate configuration which extends upwardly from the trough section to the transfer pocket to interconnect the two. In addition, the transport means 10 operates to separate out a quantity of the stacked accumulated ends in the trough section 20 and drive this quantity of ends therethrough and also through the arcuate chute 26 into the transfer pocket 24. Thereafter, the retaining assembly or retaininq means 16 is then activated for maintaining this quantity of stacked ends in the vertical transfer pocket 24 upon retraction of the transport means and in position for lateral transfer and deposit into one of the pockets or carriers of the infeed unit 25.

As indicated above, the transport means 10 comprises both a horizontal transport means 12 associated with the trough section and a rotatable swing-arm type elevating means 14 associated with the arcuate chute 26. The horizontal transport means 12 is actuated to grip a number of ends 18 in the trough 20, and is translated to the right as viewed, which serves initially to separate a quantity of can ends or stack from the incoming stream and transports this stick, designated 22, into the arcuate chute 26, leaving an open gap as indicated at reference numeral 28 in FIG. 2, in the trough section 20. Prior to retraction of horizontal transport means 12, as will be seen presently, the rotatable swing-arm 14 enters or swings into the downstream portion of the gap or open trough portion 28 and engages the trailing end of the quantity of ends or stack 22 in the arcuate section 26. The swing-arm 14 is positively driven by an actuator 42, and continues to swing or pivot to drive the stack 22 fully through the arcuate section 26 and into the vertical transfer pocket 24, as best viewed in FIG. 3. As will be more fully described presently, the retaining means 16 which is actuated when the stack 22 is fully deployed in chute 24, includes a movable shelf or plate-like member 30 which is disposable in an entrance end 32 of the transfer pocket 24 beneath the stack 22 of ends, as best seen in FIG. 3, so as to maintain and support said stacked ends 22 in said pocket 24.

The vertical transfer pocket 24 is provided with lateral transfer means in the form of a pusher bar member 31 driven by a fluid power cylinder 33 or other suitable means to effect transfer of the stack 22 therein to an adjacent vertical pocket or carrier member 35 of the infeed unit 25. It will be noted that the retaining means 16 also includes a suitable actuator means member 36 for the shelf-like member 30, adapting the shelf-like member for movement into and withdrawal from the support position of FIG. 3.

Advantageously, the swing-arm means 14 will be seen to include a projecting finger or can-engaging portion 40 which has a cross-sectional dimension smaller than that of the can ends for both engaging the can ends and at least partially entering the open end 32 of vertical transfer pocket 24 immediately behind and still supporting the stack 22 being transported thereby. As will be more fully described presently, the shelf-like member 30 has a bifurcated or fork-like configuration so as to extend to either side of the projecting abutment portion 40, as suggested in FIG. 3. This permits the shelf-like member 30 to provide support for the can ends or stack 22 prior to retraction of the swing-arm means 14 and consequent withdrawal of its can-engaging finger portion 40 from the vertical transfer pocket 24.

The swing-arm means 14 includes a drive assembly 42 for actuating an elongate arm member or portion 44 thereof in an arc so as to drive the actuating finger member 40 through the arcuate chute 26. In similar fashion, the horizontal transport means includes transport drive means 46 (see FIG. 4), which will be more fully described later, for driving the horizontal transport means 12 along the trough 20 as previously described.

In accordance with a further feature of the invention, control means 50 is provided for controlling actuation of the transport drive means 46, the swing-arm drive means 42 and the retaining means actuator means 36 in a given, predetermined sequence. The control means 50 is shown schematically in FIGS. 1-3, and is not shown or described in detail as one skilled in the art could readily develop various arrangements of sensors and relays for achieving the desired sequence of operation. The control means 50 is however, operatively associated with various sensors which monitor the position of the system components and provide control signals which are used by control means 50 to initiate the sequence of operation to be detailed hereinafter. This sequence of operation is one which initially causes the horizontal transport means 12 to be actuated for separating and thereafter transporting the ends completely through the horizontal trough and into the arcuate chute 26, as indicated for example in FIG. 2. This sequence of operation under control of control means 50 next comprises the pivoting or swinging of the swing-arm means 14 to contact the stick 22 in the arcuate chute 26 and advance it therethrough and into the vertical transfer pocket 24. It will be noted that upon contact of the swing-arm with the stack 22, as illustrated in FIG. 2, the drive or actuator means 46 will return the horizontal transport means 12 back to its initial position in readiness for engaging, separating and transporting a further quantity of can ends or stack along trough 20. Upon delivery of the stick 22 to vertical transfer pocket 24, while the swing-arm means 14 is in the position illustrated in FIG. 3, the control means 50 causes actuation of the retaining means 16 into position for supporting the ends in the vertical transfer pocket, prior to retraction of the swing-arm means 14.

In accordance with a further feature of the invention, in order to coordinate the foregoing sequence of operations by the control means 50, a stack position sensor means 60 is positioned at a predetermined downstream location along the trough 20 for sensing the absence or presence of can ends thereat and producing a corresponding signal. In this regard, the control means 50 is responsive to a signal from sensor 60 corresponding to the presence of can ends thereat for actuating the horizontal transport drive means 12, for separating out a discrete stack of ends 22 of a length defined by the longitudinal position of the stack position sensor 60 relative to the horizontal trough section 20. It will be noted that the position of sensor 60 longitudinally of trough 20 relative to the initial position of horizontal transport means 12 effectively determines the length of the stack of can ends. The length so defined is indicated by the arrows extending from reference numeral 22 in FIG. 1.

The transport means 12 is driven to the right from its initial position of FIG. 1 to that of FIG. 2, by selectively operable cylinder means under the control of the control means 50; a particular preferred type of drive cylinder will be discussed hereinafter with respect to FIGS. 4 and 5. As the transport means 12 reaches the end of its stroke, it will actuate sensor 63 which is associated with the control means 50. The signal from sensor 63 is used to initiate operation of the swing-arm arrangement 14, also to be discussed in greater detail hereinafter.

The swing-arm arrangement 14 includes sensor means 65 operatively connected to the control means 50 for mounting the position of the arm 44. As arm 44 moves forward, sensor 65 provides a signal to the control means 50 which is employed to initiate a command signal to the horizontal transport means 12 to retract said transport means from the position of FIG. 2 to the initial position of FIGS. 1 or 3. The control means 50 preferably will include a sufficient time delay such that retraction is not commenced until arm 44 is pivoted to a position to bring the abutment portion 40 into engagement with the stack 22, as shown in FIG. 2.

Next, it is necessary to sense when the stack of ends 22 has reached the loaded position of FIG. 3, in order to initiate operation of the retaining means 16, and retraction of the arm 44 to its initial position. While there are various arrangements and types of sensors that can be employed to effect this sequence of operation, FIGS. 1-3 illustrate schematically one such arrangement. More specifically, an additional sensor 67 is provided in conjunction with the arm 44 to sense its attainment of the position of FIG. 3. The sensor 67 will produce a signal to the control means 50 which indicates that a stack of ends 22 is in position in pocket 24. This signal is thus used by the control means 50 to energize the air cylinder 36 to extend the plate or shelf 30 into the stack supporting position. Additional sensing means, (not shown) will monitor the position of the shelf 30, and once in position will operate via the control means 50 to pivot arm 44 back to its initial or start position.

Thus, the stack of ends 22 will now be supported within the pocket 24, and in position to be transferred to the pockets 35 of the infeed unit 25. In conjunction with the infeed unit 25, sensing means 69 are employed to sense when an empty carrier or pocket 35 is aligned with the transfer pocket 24. When this occurs, a control signal is produced which is provided to the control means 50 and is used to generate a command signal to actuate the fluid cylinder 33. Operation of the cylinder 33 will extend the pusher bar member 31 forcibly to transfer a stack of ends 22 laterally from pocket 24 to the empty carrier pocket 35. The operation of the cylinder 33 is double acting such that after extending the bar 31 it retracts. In conjunction with the retraction of the bar 31, the shelf 30 is also retracted, thus clearing the entry portion of the transfer pocket 24 for the next stack of ends 22 to be delivered thereto by the swing-arm arrangement 14.

In the preferred embodiment illustrated, an additional decision sensor means 62 is further positioned along the horizontal trough section 20 generally upstream of the stack position sensor 60 with respect to the direction of travel of can ends 18. In similar fashion to stack position sensor 60, this latter decision sensor 62 is responsive to presence or absence of can ends thereat or immediately adjacent thereto in the trough 20 for producing corresponding signals. The control means 50 is responsive to a signal from decision sensor 62 corresponding to the presence of can ends thereat during a time interval between initial actuation of the swing-arm means 14 and full retraction thereof for producing a stop control signal for use by suitable upstream means (not shown) for halting the delivery of further can ends 18 to the horizontal trough section 20. It will be appreciated that provision of the additional decision sensor 62 prevents can ends 18 from advancing as far as the stack sensor 60 (which would initiate separation out and transport of a further stick) until the swing-arm 14 has returned to its initial position shown in FIG. 1, ready to engage and transport a further stick of ends. Under normal circumstances, the action of the swing-arm in transporting each stick 22 to the transfer pocket 24 and its return to its initial position shown in FIG. 1 occurs before the can ends 18 have again advanced to stack position sensor 60. However, the additional decision sensor 62 is provided somewhat upstream of stack position sensor 60 to assure that delivery of can ends 18 to trough 20 remains coordinated with the operation of the apparatus.

Figure 6:
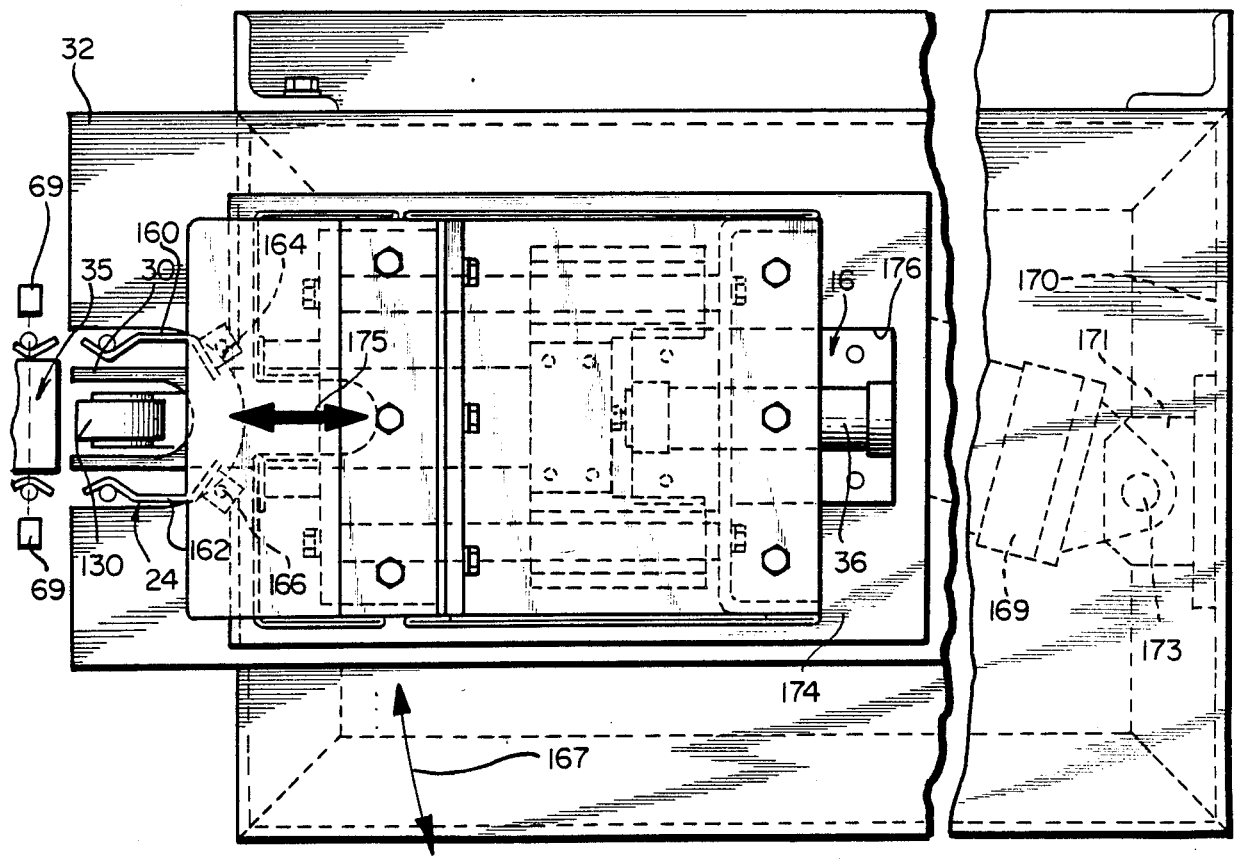
FIG. 6 is an enlarged, detailed sectional view of the transfer apparatus taken generally in the plane of the line 6—6 of FIG. 1, and rotated 180°.
Figure 4:
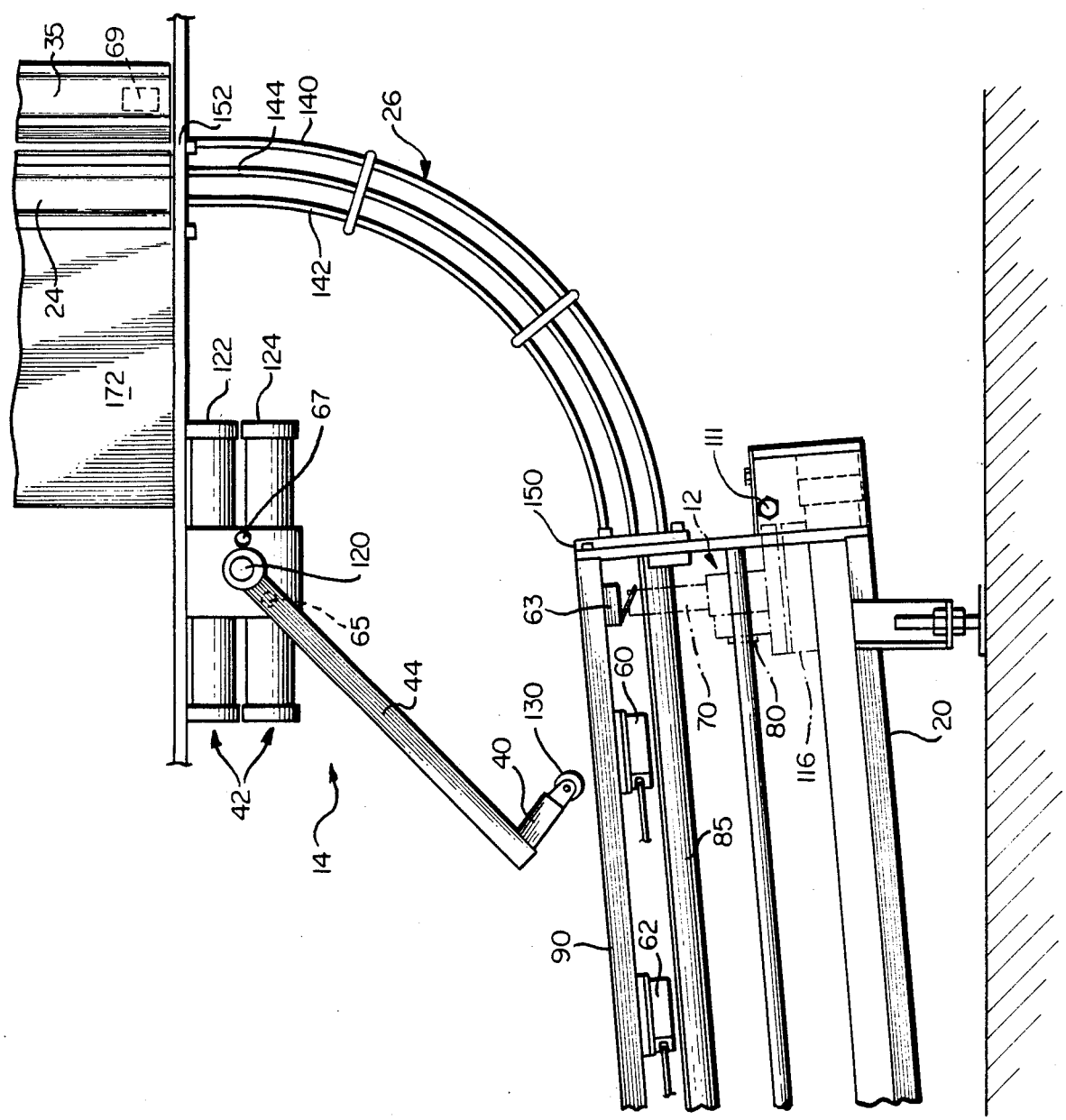
FIG. 4 is an enlarged detailed partial side elevation of a portion of the assembly of the invention.
Figure 5:
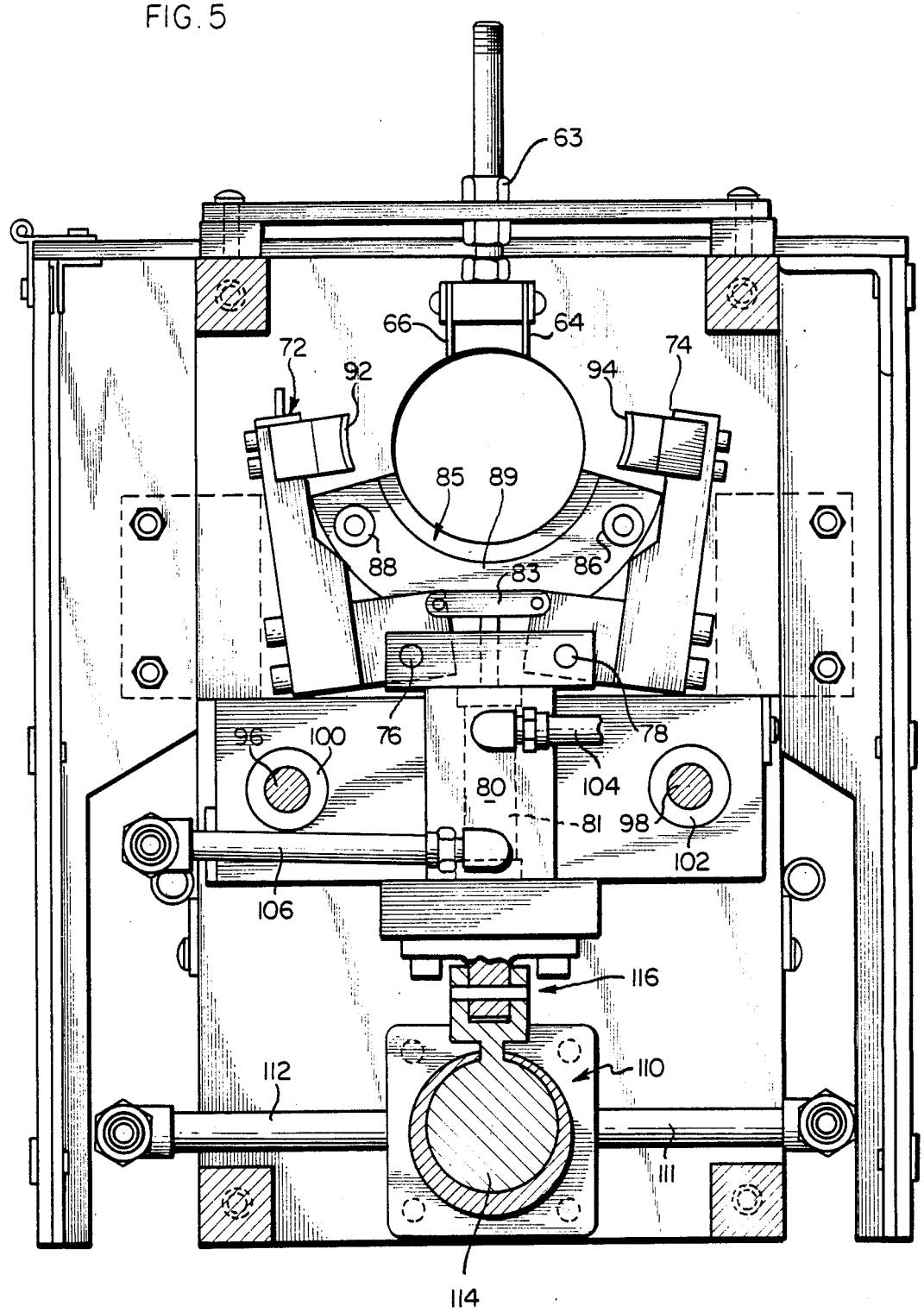
FIG. 5 is a further enlarged sectional view taken generally in the plane of the line 5—5 of FIG. 4.

Referring now to FIGS. 4 through 6, additional details of the above-described structures are illustrated. Referring initially to FIGS. 4 and 5, the horizontal transport means includes clamp means or jaw-like structure 70, which comprises a pair of substantially identical opposed and inwardly facing clamp or jaw members 72, 74. These clamp members 72, 74 are respectively pivotally mounted at pivots 76, 78 on a mounting block 80, which as discussed hereinafter is supported for linear movement.

The trough member 20 is defined by an elongate arcuate trough 85 which may be supported by a pair of rod-like support members 86, 88 and has a generally semi-circular configuration to complementarily receive the can ends 18 for slidably riding therealong. The respective guide bars or rods 86, 88 are mounted to a generally arcuate supporting end plate 89. Additional support for the accmulating can ends is preferably provided at an upstream end of trough 20. This additional support is provided by a pair of elongate resilient strips 64, 66 which are supported on a overhead mounting assembly designated generally by reference numeral 65. Bars or rods 86, 88 may mount similar flexible strips (not shown) to resiliently guide and support the can ends along the trough 20 defined thereby.

The jaws 72, 74 are arranged symmetrically to either side of the trough or track defined for the can ends by these guide rods or bars 86, 88. Additionally, the above-described sensors 60, 62 and 63 are respectively mounted to an upper support member or bar 90 and preferably comprise photoelectric or other optical-type sensors for sensing the presence or absence of can ends or other structure in registry therewith. In order to accurately and rapidly separate a given group or stick 22 (see FIG. 1) of can ends from the accumulated can ends in the trough 20, the respective jaws or clamps 72, 74 are provided with inwardly projecting blade-like separator edge means or members 92, 94. These blade-like separator edges are adapted to extend or project intermediate adjacent ones of the stacked can ends to effect the desired separation. Hence, the clamp members 72, 74 engage the separated can ends both at a rear surface thereof due to the insertion of blades 92 and 94 during separation and also in a surrounding clamping fashion with respect to a plurality of the ends 18 at a rear or downstream portion of the separated group of can ends or stack 22.

The actuator and drive means 46 for driving the horizontal transport means or clamps 72, 74 longitudinally of trough 20 includes a pair of elongate guide rod or bar members 96, 98 which extend the length of trough 20. The mounting block 80 is provided with a pair of generally cylindrical bearing members 100, 102 extending therethrough for slidably engaging the guide rods 96, 98. The jaws 72 and 74 are pivoted respectively inwardly and outwardly by fluid operated cylinder 81 coupled to said jaws by an arm 83, said cylinder being actuated by control means 50. In this regard, the mounting block 80 carries the fluid cylinder 81 which is operatively connected to the respective jaws 72 and 74 to effect the pivotal movement for opening and closing thereof. Fluid inlet and outlet tubes or hoses 104, 106 are coupled with the mounting block 80 and the fluid cylinder carried thereby and are preferably fed by way of respective elongate, flexible coiled tubing or hose members indicated somewhat schematically at 108 in FIG. 4. These coiled hoses are adapted to extend and contract in unison with the movement of the mounting block 80 and jaws or clamp means 72, 74 longitudinally of the trough 20.

The drive means for effecting linear movement of the mounting block 80 and jaws 72, 74 along guide rods 96 and 98 longitudinally of trough 20 includes a fluid-operated cylinder drive member 110. This cylinder 110 is a double-acting cylinder and receives pressurized fluid by way of fluid lines 111, 112 under the control of the control means 50. A free piston 114 is carried in the cylinder 110 and arranged to move longitudinally with respect thereto. Since the cylinder 110 is double-acting or double-ended, fluid may be introduced into either side thereof so as to bidirectionally drive the piston 114. Mounting block 80 is mounted by an intermediate mounting mechanism or assembly 116 to the piston 114. Such a cylinder and free piston device is sold under the trademark ORIGA by Origa International A.B., Kungsor, Sweden. A more detailed description of such a drive means and clamp actuator assembly of the general type shown and described can be found in the aforementioned U.S. Pat. No. 4,537,500, again incorporated herein by reference.

In operation, as suggested in FIGS. 1 through 3, the clamp motion from a starting point A to a finish point B urges the separated ends or stack 22 along the trough and up and into the curved or arcuate chute 26. Thus, a discrete stack of can ends is developed from the incoming continuous stream of ends 18 and this stack is positioned in chute 26 for further transport to the vertical transfer pocket 24 by the action of swing-arm means 14 as indicated hereinabove. In this regard, the vertically elongated transfer pocket 24 is aligned with the chute 26 to receive the can ends therefrom.

As best viewed in FIG. 4, elongate swing-arm member 44 of the swing-arm assembly 14 is pivotally mounted at 120 to be bidirectionally pivoted or rotated by the drive assembly 42. This drive assembly 42 comprises a pair of oppositely acting drive cylinders 122, 124 which drive a rack and pinion arrangement of known design and coupled to the arm 44. Preferably, cylinder 122 and 124 are fluid operated and receive actuating fluid under the control of control means 50. As previously mentioned, the swing-arm 44 terminates in a laterally outwardly extending abutment portion 40 which is formed or attached at somewhat less than a right angle with respect to pivot arm 44. In the illustrated embodiment, the abutment finger 40 is provided at its outer end with a rotatably mounted wheel or supporting roller member 130 for engaging the trailing end of the stack of ends 22, as indicated for example in FIGS. 2 and 3. This roller engages the stack 22 completely during movement through chute 26 and extends somewhat into vertical transfer pocket 24, as previously described with reference to FIGS. 2 and 3. The provision of roller 130 thus minimizes frictional contact or rubbing of the trailing end portion of the stack 22 to avoid possible damage or abrasion to an endmost can end as the stack 22 is transported along and through the arcuate chute 26.

In this regard, arcuate chute 26 is formed from a plurality of generally arcuate rod-like guide bars 140, 142, 144, etc. which are mounted intermediate respective end support-and-attachment means comprising generally annular collar members 150, 152. These latter annular collars 150 and 152 are respectively mounted by bolting or other suitable means respectively to an outlet end of trough 20 and inlet end 32 of vertical transfer pocket 24.

Referring now also to FIG. 6, the vertical transfer assembly is shown in greater detail and in this regard, pocket 24 will be seen to be formed from a pair of opposed, generally arcuate side walls 160, 162 which are mounted for pivotal motion upon respective ear-and-pin devices 164, 166. This pivotal mounting permits transfer of the stack 22 from the transfer pocket 24 to an aligned, and similarly constructed vertical carrier member 35 of the infeed unit 25. That is, as the pusher bar 31 is actuated, the respective arcuate sidewall members 160 and 162 may be pivoted outwardly to extend around respective facing sides of cartridge 35 so as to push the stick 22 into the latter.

In the event that the carrier pockets 35 of the infeed unit 25 are full it is necessary to provide for discharge from the pocket 24 so that the machinery supplying ends to the unit 10 need not shut down. Accordingly, in one contemplated form of the invention, the entire transfer pocket assembly is carried on a pivotally mounted plate 174 and may be pivoted away from the infeed unit 25 so that the stack of ends 22 may be ejected to a manual bagger station, or possibly a second infeed unit (not shown) for storage. An arrangement of this general nature is shown in Appliant's prior U.S. Pat. No. 4,537,550, the disclosure of which has been incorporated herein by reference. In this regard, the transfer arrangement of FIG. 6 includes the transfer pocket 24, shelf 30, actuator 36 and pusher bar 31 and its actuator 33, all mounted to plate 174 for pivotal movement as indicated by arrow 167. To effect this pivotal movement a cylinder 169 is provided which is attached to plate 174 and also is mounted to a frame portion 170 by bracket means 171 which defines a pivot 173. Upon actuation of cylinder 169 the entire discharge assembly will pivot as indicated by arrow 167.

The support shelf or member 30 is bifurcated as shown in FIG. 6, and is operated between the retracted and extended positions (full line in FIG. 6) by the drive means or actuator member 36. This actuator member 36 comprises a further piston and cylinder member or assembly mounted to frame member 174, which frame member defines, a generally open interior portion or slot 176 for receiving piston and cylinder 36. The latter support-shelf 30 is slidably mounted relative to frame member 174 and operatively coupled to the drive member 36 to operate between fully extended and fully retracted positions as shown in full line and phantom line, respectively, and as indicated by double arrows 175 in FIG. 6. Further in FIG. 6, the roller 130 affixed to the end of the arm 44 can be seen disposed between the bifurcated portions of the fork-like support member 30.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. Apparatus for supplying can ends or the like to a downstream processing unit, such as a rotary carousel feeder unit or the like, said apparatus comprising in combination: a generally horizonal trough section for accumulating in stacked array can ends delivered from an upstream source; a transfer pocket disposed generally vertically above and to one end of said trough section for receiving a quantity of can ends in stacked array from said trough section; an intermediate transition chute means of generally arcuate configuration extending upwardly from said trough section to said transfer pocket to interconnect said trough section and said transfer pocket; transport means for separating out and driving a quantity of the stacked accumulated can ends in said trough section along said trough section and through said arcuate chute means and further into said transfer pocket; and retaining means for maintaining said quantity of stacked can ends in said vertically disposed transfer pocket upon retraction of said transport means; wherein said transport means comprises horizontal transport means associated with said trough section for initially separating a quantity of can ends therein and transporting said separated can ends through said trough section and into said arcuate chute means thereby leaving a cap therebehind in said section, and rotatable swing-arm means for entering said cap to contact a trailing end of said quantity of can ends in said arcuate chute means and for driving said quantity of can ends fully through said arcuate chute means and into said vertical transfer pocket, said swing-arm means including support means for supporting said stacked array of can ends within said transfer pocket following said driving of the can ends thereinto from the arcuate chute means.

2. Apparatus according to claim 1 wherein said retaining means for maintaining a quantity of stacked can ends in said transfer pocket includes a movable shelf-like member disposable in an entrance end of said vertical transfer pocket to support the stacked can ends therein.

3. Apparatus according to claim 2 and further including actuator means for said shelf-like member adapting same for movement into and withdrawal from a position for blocking an inlet end of said transfer pocket for supporting said stacked can ends therewithin.

4. Apparatus according to claim 1 wherein said horizontal transport means includes clamp means for engaging the can ends in said trough section, and transport drive means for moving said clamp means longitudinally of said trough section to transport the cans ends from said trough section into said chute means.

5. Apparatus according to claim 4 wherein said clamp means further includes blade-like separator edge means thereon for extending intermediate adjacent stacked can ends so as to separate said quantity of stacked can ends from the stacked can ends within said trough section prior to movement thereof longitudinally of said trough section.

6. Apparatus according to claim 1 and further including transport drive means, swing-arm drive means; actuator means for actuating said horizontal transport means, said swing-arm means and said retaining means respectively; and control means for controlling actuation of said transport drive means, said swing-arm drive means and said retaining means, respectively, in a predetermined sequence for initially separating and horizontally transporting of said can ends to said arcuate chute means, for thereafter transporting said can ends through said chute means and into said vertical transfer pocket, and for thereafter, immediately prior to retraction of said swing-arm means, actuating said retaining means into position for supporting said can ends in said vertical transfer pocket.

7. Apparatus according to claim 6 and further including stack position sensor means disposed at a predetermined, generally downstream position along said horizontal trough section for sensing the presence or absence of can ends thereat and producing a corresponding signal, said control means being responsive to a signal corresponding to presence of can ends at said stack position sensor means for actuating said transport drive means to thereby separate out a discrete stack of a length defined by the longitudinal position of said stack position sensor means, relative to the length of said horizontal trough section.

8. Apparatus according to claim 7 and further including decision sensor means located along said horizontal trough section upstream of said stack position sensor means and responsive to presence or absence of can ends thereat for producing corresponding signals; said control means being responsive to a signal corresponding to presence of said can ends at said decision sensor means during a time interval between actuation of said swing-arm means for advancing said can ends into said vertical transfer pocket and full retraction of said swing-arm means, for producing a stop control signal for use by upstream means in halting the delivery of further can ends to said horizontal trough section.

9. Apparatus according to claim 6 wherein said control means is further operative for retracting said horizontal transport means upon initial activation of said swing-arm means into contact with said quantity of can ends.

10. A method of supplying can ends or the like to a downstream processing unit, the method comprising, in order, the steps of: accumulating a quantity of can ends in horizontally stacked array in a generally horizontal trough section; separating a quantity of can ends from said accumulated stacked array; moving the separated quantity of can ends horizontally through said trough section and into a transition chute; moving the quantity of can ends in said transition chute completely therethrough and into a vertically stacked arrangement in a transfer pocket; engaging the can ends in said transfer pocket with retaining means to prevent movement thereof back into said transition chute, which step includes the step of inserting a supporting member beneath the vertically stacked ends in said transfer pocket wherein the step of moving the quantity of can ends through said transition chute and into said transfer pocket includes the steps of initially engaging said can ends with pivot arm means, advancing said pivot arm means and said can ends through said transition chute and into said transfer pocket, and continuing to engage said can ends with said pivot arm means so as to support said can ends in said vertically stacked arrangement in said transfer pocket until actuation of said supporting member into position for engaging said can ends to prevent movement thereof back into said transition chute.

11. A method according to claim 10 and further including, prior to the step of separating, the step of sensing the presence or absence of can ends at a predetermined downstream position in said horizontal trough section; and conditioning said separating and moving of the quantity of can ends from said accumulated stacked array on the prior sensing of can ends present at said predetermined downstream position in said horizontal trough section.

12. A method according to claim 10 and further including, substantially simultaneously with moving said quantity of can ends through said transition chute and into vertically stacked arrangement in said transfer pocket, the step of accumulating a further quantity of can ends in horizontally stacked array; and, following the step of inserting said supporting member, separating and moving a further quantity of can ends from said accumulated stacked array horizontally through said trough section.

13. Apparatus for supplying can ends or the like to a downstream processing unit, such as rotary carousel feeder unit or the like, said apparatus comprising in combination: a generally horizontal trough section for accumulating in stacked array can ends delivered from an upstream source; a transfer pocket disposed generally vertically above and to one end of said trough section for receiving a quantity of can ends in stacked array from said trough section; an intermediate transition chute means of generally arcuate configuration extending upwardly from said trough section to said transfer pocket to interconnect said trough section and said transfer pocket; transport means for separating out and driving a quantity of the stacked accumulated can ends in said trough section along said trough section and through said arcuate chute means and further into said transfer pocket; wherein said transport means comprises horizontal transport means associated with said trough section for initially separating a quantity of can ends therein and transporting said separated can ends through said trough section and into said arcuate chute means thereby leaving a gap therebehind in said trough section, and rotatable swing-arm means for entering said gap to contact a trailing end of said quantity of can ends in said arcuate chute means and for driving said quantity of can ends fully through said arcuate chute means and into said vertical transfer pocket, said swing-arm means including support means for supporting said stacked array of can ends within said transfer pocket following said driving of the can ends thereinto from the arcuate chute means, wherein said support means comprises a projection having a cross-sectional dimension smaller than that of said can ends in order for extension of said projection into an open end of said vertical transfer pocket during said support of the stacked array therein.

14. Apparatus according to claim 13, wherein said projection includes a roller member for engagement of the endmost can end in said array.

15. Apparatus according to claim 13, further comprising retaining means for maintaining said quantity of stacked can ends in said vertical transfer pocket upon retraction of said swing-arm means and withdrawal of said projection.

16. Apparatus according to claim 15 wherein said retaining means includes a movable shelf-like member disposable in said open end of said vertical transfer pocket to support the stacked can ends therein.

17. Apparatus according to claim 16 and further including actuator means for said shelf-like member adapting same for movement into and withdrawal from a position supporting said stacked can ends therewithin.

18. Apparatus for supplying can ends or the like to a downstream processing unit, such as a rotary carousel feeder unit or the like, said apparatus comprising in combination: a generally horizontal trough section for accumulating in stacked array can ends delivered from an upstream source; a transfer pocket disposed generally vertically above and to one end of said trough section for receiving a quantity of can ends in stacked array from said trough section; an intermediate transition chute means of generally arcuate configuration extending upwardly from said trough section to said transfer pocket to interconnect said trough section and said transfer pocket; transport means for separating out and driving a quantity of the stacked accumulated can ends in said trough section along said trough section and through said arcuate chute means and further into said transfer pocket; and retaining means for maintaining said quantity of stacked ends in said vertically disposed transfer pocket upon retraction of said transport means; wherein said transport means comprises horizontal transport means associated with said trough section for initially separating a quantity of can ends therein and transporting said separating can ends through said trough section and into said arcuate chute means thereby leaving a gap therebehind in said trough section, and rotatable swing-arm means for entering said cap to contact a trailing end of said quantity of can ends in said arcuate chute means and for driving said quantity of can ends fully through said arcuate chute means and into said vertical transfer pocket, said swing-arm means including support means for supporting said stacked array of can ends within said transfer pocket following said driving of the can ends thereinto from the arcuate chute means, wherein said retaining means includes a movable shelf-like member disposable in an entrance end of said vertical transfer pocket to support the stacked can ends therein, and said swing-arm means includes a projecting finger of a cross-sectional dimension smaller than that of said can ends for engaging said can ends and at least partially entering an entrance end of said vertical transfer pocket immediately behind a group of can ends being transported thereby, and wherein said shelf-like member includes a fork-like end portion adapted to extend to either side of said finger for supporting said can ends prior to retraction of said swing-arm means and consequent withrawal of said can-engaging finger from said vertical transfer pocket.

19. A method of supplying can ends or the like to a downstream processing unit, the method comprising, in order, the steps of: accumulating a quantity of ends in horizontally stacked array in a generally horizontal trough section; separating a quantity of can ends from said accumulated stacked array; moving the separated quantity of can ends horizontally through said trough section and into a transition chute; moving the quantity of can ends in said transition chute completely therethrough and into a vertically stacked arrangement in a transfer pocket; engaging the can ends in said transfer pocket with retaining means to prevent movement thereof back into said transition chute, which step includes the step of inserting a supporting member beneath the vertically stacked can ends in said transfer pocket wherein the step of moving the quantity of ends through said transition chute and into said transfer pocket includes the steps of initially engaging said can ends with pivot arm means, advancing said pivot arm means and said can ends through said transition chute and into said transfer pocket, and continuing to engage said can ends with said pivot arm means so as to support said can ends in said vertically stacked arrangement in said transfer pocket until actuation of said supporting member into position for engaging said can ends to prevent movement thereof back into said transition chute; and further including preventing said moving any of said can ends into said transition chute during said advancing of the pivot arm means and can end into said transfer pocket.

* * * * *